US008119074B2

(12) United States Patent
Aguilar Elguezabal et al.

(10) Patent No.: US 8,119,074 B2
(45) Date of Patent: Feb. 21, 2012

(54) METHOD AND APPARATUS FOR THE CONTINUOUS PRODUCTION OF CARBON NANOTUBES

(75) Inventors: Alfredo Aguilar Elguezabal, Chihuahua (MX); Manuel Roman Aguirre, Chihuahua (MX); Beatriz Ortega Garcia, Chihuahua (MX); Gustavo Vicente Camacho Villarello, Chihuahua (MX)

(73) Assignee: Centro de Investigacion en Materiales Avanzados, S.C, Chihuahua (MX)

( * ) Notice: Subject to any disclaimer, the term of this patent is extended or adjusted under 35 U.S.C. 154(b) by 204 days.

(21) Appl. No.: 12/426,971

(22) Filed: Apr. 21, 2009

(65) Prior Publication Data

US 2010/0150815 A1 Jun. 17, 2010

(30) Foreign Application Priority Data

Dec. 17, 2008 (MX) .................... MX/a/2008/006185

(51) Int. Cl.
*B01J 19/00* (2006.01)
*B01J 19/26* (2006.01)
*D01F 9/12* (2006.01)

(52) U.S. Cl. ........ 422/150; 422/152; 422/158; 422/650; 422/210; 422/105; 423/447.1; 423/445 B; 977/742

(58) Field of Classification Search ................... 422/150, 422/152, 158, 650, 210, 105; 423/447.1, 423/445 B; 977/742
See application file for complete search history.

(56) References Cited

U.S. PATENT DOCUMENTS

| 5,413,773 | A | * | 5/1995 | Tibbetts et al. ............ 423/447.3 |
|---|---|---|---|---|
| 6,413,487 | B1 | | 7/2002 | Resasco et al. |
| 6,730,284 | B2 | | 5/2004 | Harutyunyan et al. |
| 6,821,730 | B2 | | 11/2004 | Hannah |
| 6,855,659 | B1 | | 2/2005 | Zhang |
| 6,878,360 | B1 | | 4/2005 | Ohsaki |
| 6,884,404 | B2 | | 4/2005 | Anazawa |
| 6,919,064 | B2 | | 7/2005 | Resasco et al. |
| 6,946,197 | B2 | | 9/2005 | Yadav |
| 6,955,800 | B2 | | 10/2005 | Resasco et al. |
| 7,125,525 | B2 | | 10/2006 | Mauro |
| 7,157,069 | B2 | | 1/2007 | Jurng |
| 7,160,531 | B1 | | 1/2007 | Jacques |
| 7,180,174 | B2 | | 2/2007 | Koning |
| 7,244,408 | B2 | | 7/2007 | Ryzhkov |
| 7,261,779 | B2 | | 8/2007 | Gardner |

(Continued)

FOREIGN PATENT DOCUMENTS

EP 1452486 9/2003

(Continued)

*Primary Examiner* — Jennifer A Leung
(74) *Attorney, Agent, or Firm* — DeFillo & Associates, Inc.; Evelyn A. Defilló

(57) ABSTRACT

The present invention relates to an apparatus for the continuous production of carbon nanotubes (CNT), as well as the method to carry it out. The apparatus for the CNT synthesis includes: two sets or more of tubes to synthesize in its interior the CNT; a set of nozzles for the same number of tubes that each set has, to feed to the interior of the tubes the precursory chemical compounds of the CNT; a furnace to maintain one of the sets to a suitable temperature to allow the formation of the CNT inside the tubes; a system for the detaching and collection of the CNT formed in the previous stage; and a control system, preferably a PLC (PLC by its abbreviation in English) to program the sequence of activities of the equipment.

6 Claims, 8 Drawing Sheets

U.S. PATENT DOCUMENTS

Figure 1:
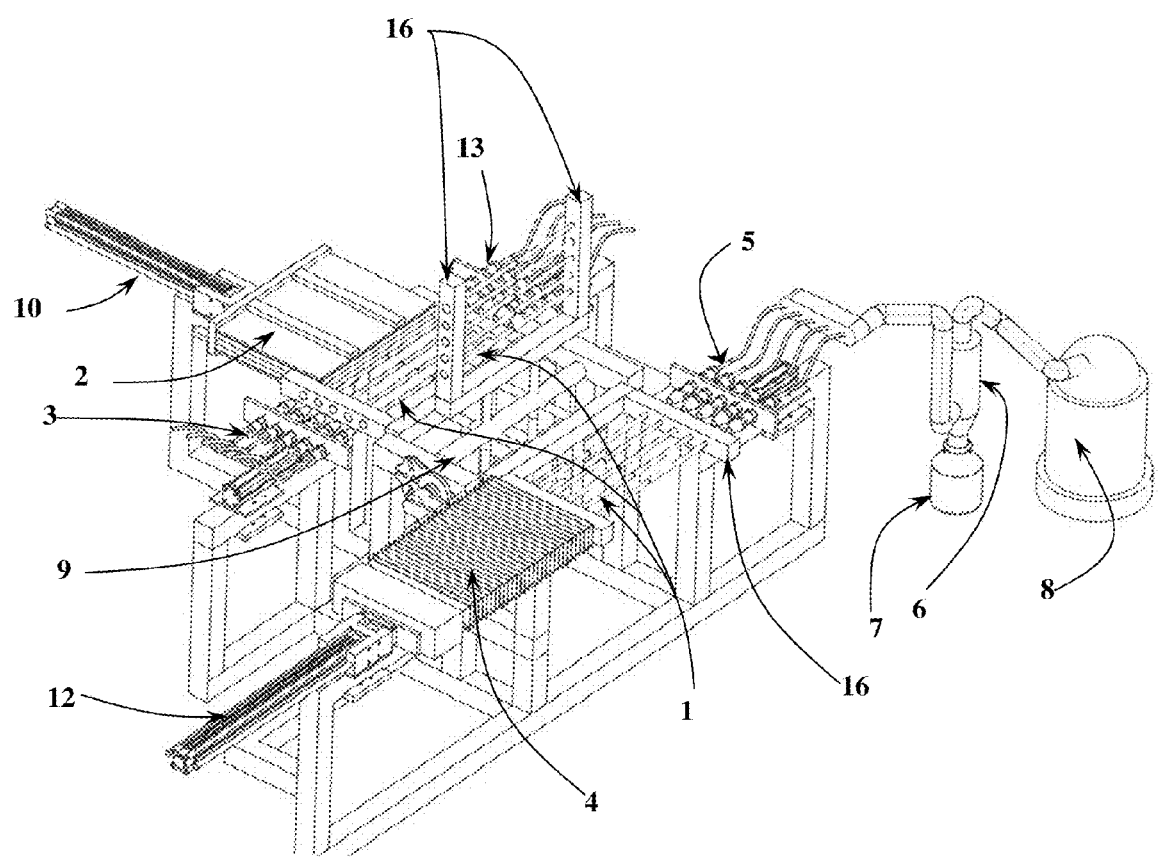

| | | |
|---|---|---|
| 2001/0050219 A1 | 12/2001 | Anazawa et al. |
| 2001/0053344 A1 | 12/2001 | Harutyunyan et al. |
| 2003/0133866 A1 | 7/2003 | Jurng |
| 2004/0149209 A1 | 8/2004 | Dai et al. |
| 2004/0151654 A1 | 8/2004 | Wei et al. |
| 2004/0213727 A1 | 10/2004 | Mauro |
| 2004/0245088 A1 | 12/2004 | Gardner |
| 2004/0265211 A1 | 12/2004 | Dillon et al. |
| 2005/0042162 A1 | 2/2005 | Resasco et al. |
| 2006/0034747 A1 * | 2/2006 | Merino Sanchez et al. ................. 423/447.3 |
| 2006/0039849 A1 | 2/2006 | Resasco et al. |
| 2006/0099136 A1 | 5/2006 | Dillon et al. |
| 2006/0252853 A1 | 11/2006 | Alayan et al. |
| 2008/0038183 A1 | 2/2008 | Nakatay |
| 2008/0063586 A1 | 3/2008 | Oya et al. |
| 2008/0063587 A1 | 3/2008 | Strano et al. |
| 2008/0063588 A1 | 3/2008 | Smalley |
| 2008/0063589 A1 | 3/2008 | Nakayama et al. |
| 2008/0075651 A1 | 3/2008 | Higashi |
| 2008/0076837 A1 | 3/2008 | Kupper et al. |

FOREIGN PATENT DOCUMENTS

| | | |
|---|---|---|
| EP | 1787955 | 7/2005 |
| JP | 2002293524 | 10/2002 |
| JP | 2003081617 | 3/2003 |
| WO | WO 2004083502 | 9/2004 |
| WO | WO 2005007571 | 1/2005 |
| WO | WO 200611655 | 2/2006 |
| WO | WO 2007010191 | 1/2007 |
| WO | WO2007061078 | 5/2007 |

* cited by examiner

METHOD AND APPARATUS FOR THE CONTINUOUS PRODUCTION OF CARBON NANOTUBES

FIELD OF THE INVENTION

The present invention relates to an apparatus for the continuous production of carbon nanotubes (CNT), as well as to the method to carry it out.

BACKGROUND OF THE INVENTION

The carbon nanotubes (CNT) are cylindrical structures whose wall has the chemical composition and the disposition of graphite, for these features they are considered to be formed by rolled graphite. The CNT exist with a single wall, known as single walled CNT or SWCNT by their abbreviations in English, or multiple walled, MWCNT by their abbreviation in English.

The mass production interest of these nanotubes has risen because of the development of several applications in the materials field, such as fiber components, as an additive to improve mechanical properties or electrical conduction, or as a component in the electronic and optoelectronic product integration.

As mentioned by Resasco (U.S. Pat. No. 6,413,487), there are three conventional methods for the massive synthesis of carbon nanotubes. The first one is the production by using electric arc, that generally requires the use of graphite electrodes (U.S. Pat. Nos. 6,884,404, 7,244,408, or US Patent Application Publication No. 2001/00502219).

Another method widely known is based on the use of particles from which the CNT grow; enabling these particles to be deposited in a substrate or being in suspension through a fluidized bed (U.S. Pat. Nos. 6,413,487; 6,730,284; 6,919,064; 6,955,800; and US Patent Publications Nos. 2001/0053344, 2004/0149209, 2004/151654, and 2006/0039849).

Finally, a third method frequently used is the formation of CNT in a surface under controlled temperature in which simultaneously are fed a CNT precursor that donates the carbon and a molecule that donates a metallic element that acts as a catalyst to promote the organization of the hydrocarbon to form the graphite walls. This method is called spray pyrolysis. Jacques and Andrews (U.S. Pat. No. 7,160,531) developed a method using this principle, in which the production is performed by using a conveyor belt having the flat pieces that are used as a substrate for the growth of the CNT. In order to spray the solution containing the precursor and catalyst, a porous medium is used, which according to the inventors allows the regulation of the diameter of the formed CNT. Finally the piece in which the CNT is formed is taken to another area where the CNT are removed by mechanical form or by ultrasound.

SUMMARY OF THE INVENTION

The apparatus for the CNT synthesis comprises:
two sets or more of tubes to synthesize in its interior the CNT,
a set of nozzles for the same number of tubes that each set has, wherein the nozzles feed the interior of the tubes with precursory chemical compounds of the CNT,
a furnace to maintain one of the sets of tubes to a suitable temperature to allow the formation of the CNT inside the tubes,
a system for the detaching and collection of the CNT formed in the previous stage, and
a control system, preferably a programmable logic control, PLC (PLC by its abbreviation in English) to program the sequence of activities of the equipment.

BRIEF DESCRIPTION OF ITS FIGURES

FIG. 1.—Illustrates a perspective view of the complete apparatus to produce carbon nanotubes in a continuous way.

Figure 2:
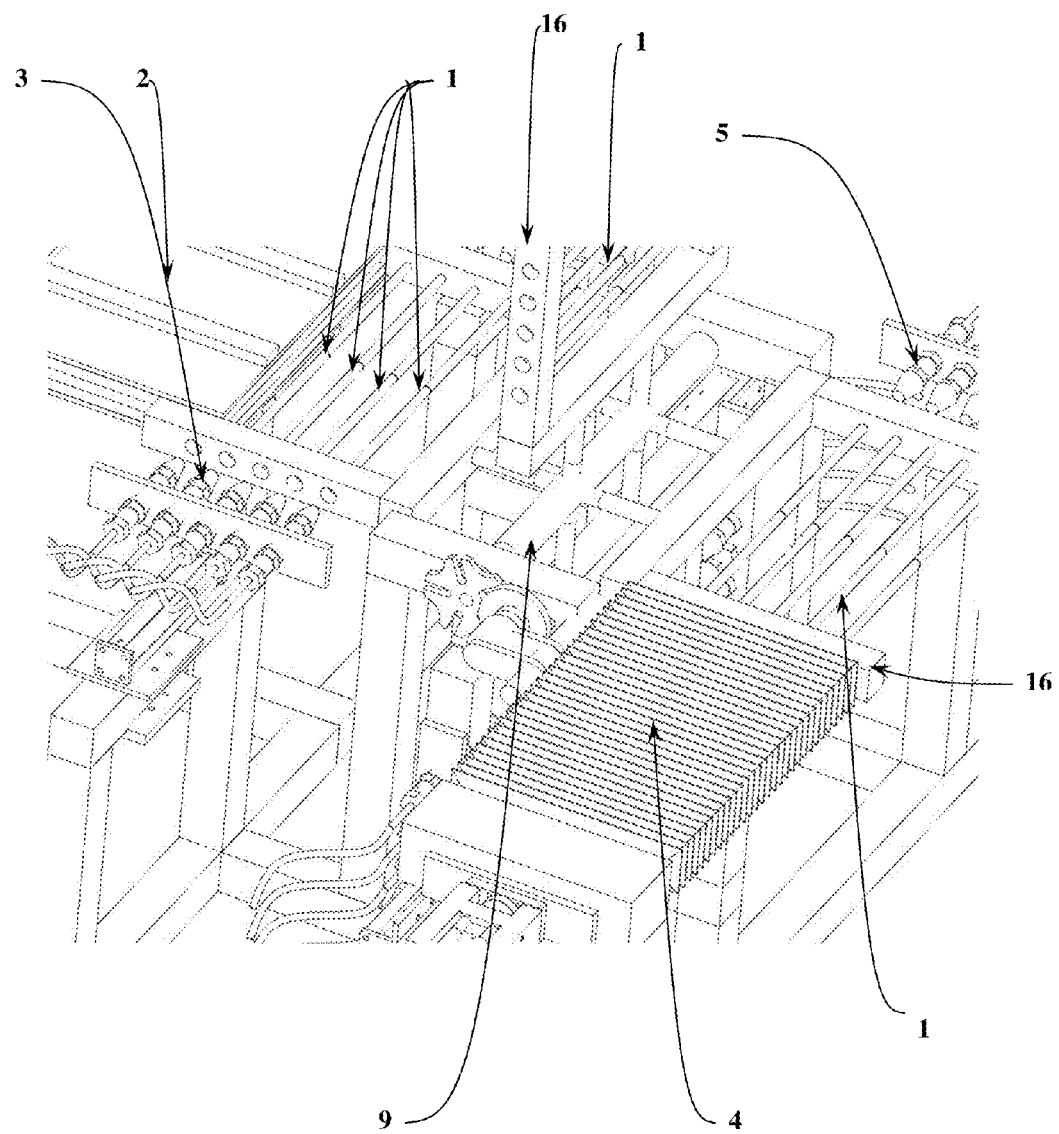

FIG. 2.—Illustrates a perspective view of the central detail of the apparatus where it shows the axis on which turns the frame of each set of tubes.

Figure 3:
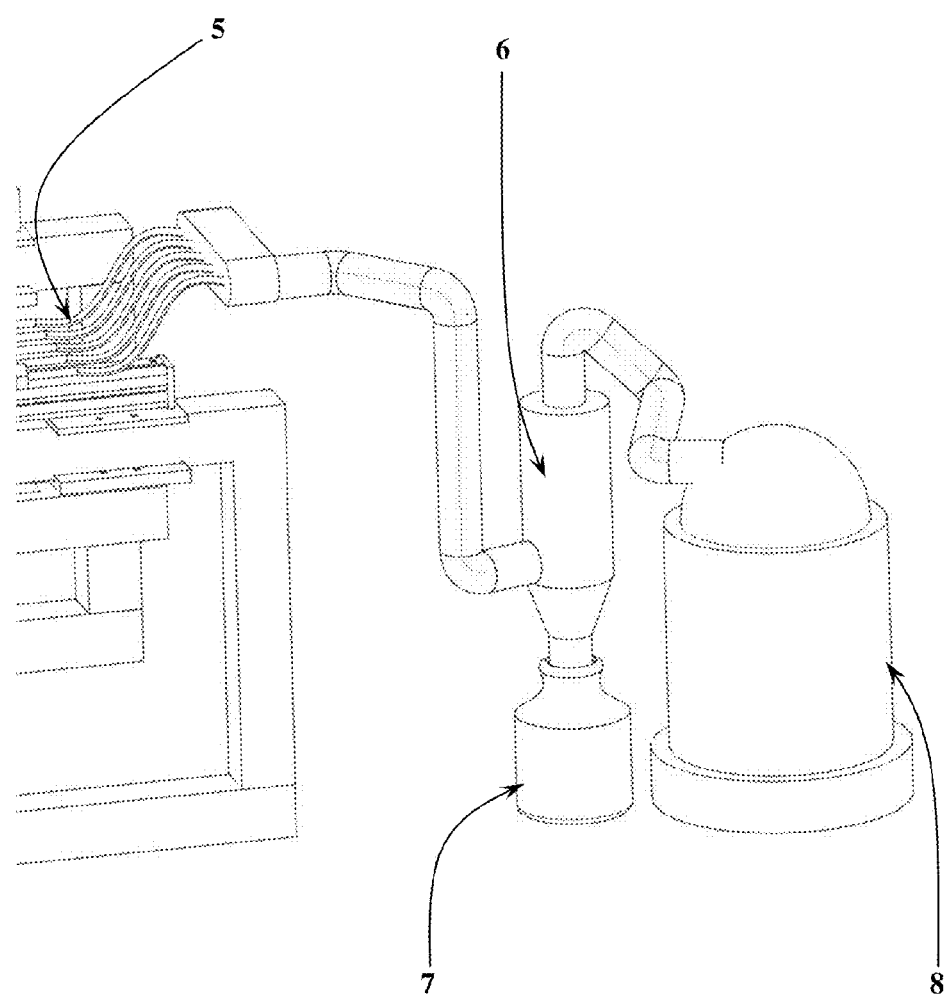

FIG. 3.—Illustrates a perspective view of the details of the cyclone and container for the collection of the CNT.

Figure 4:
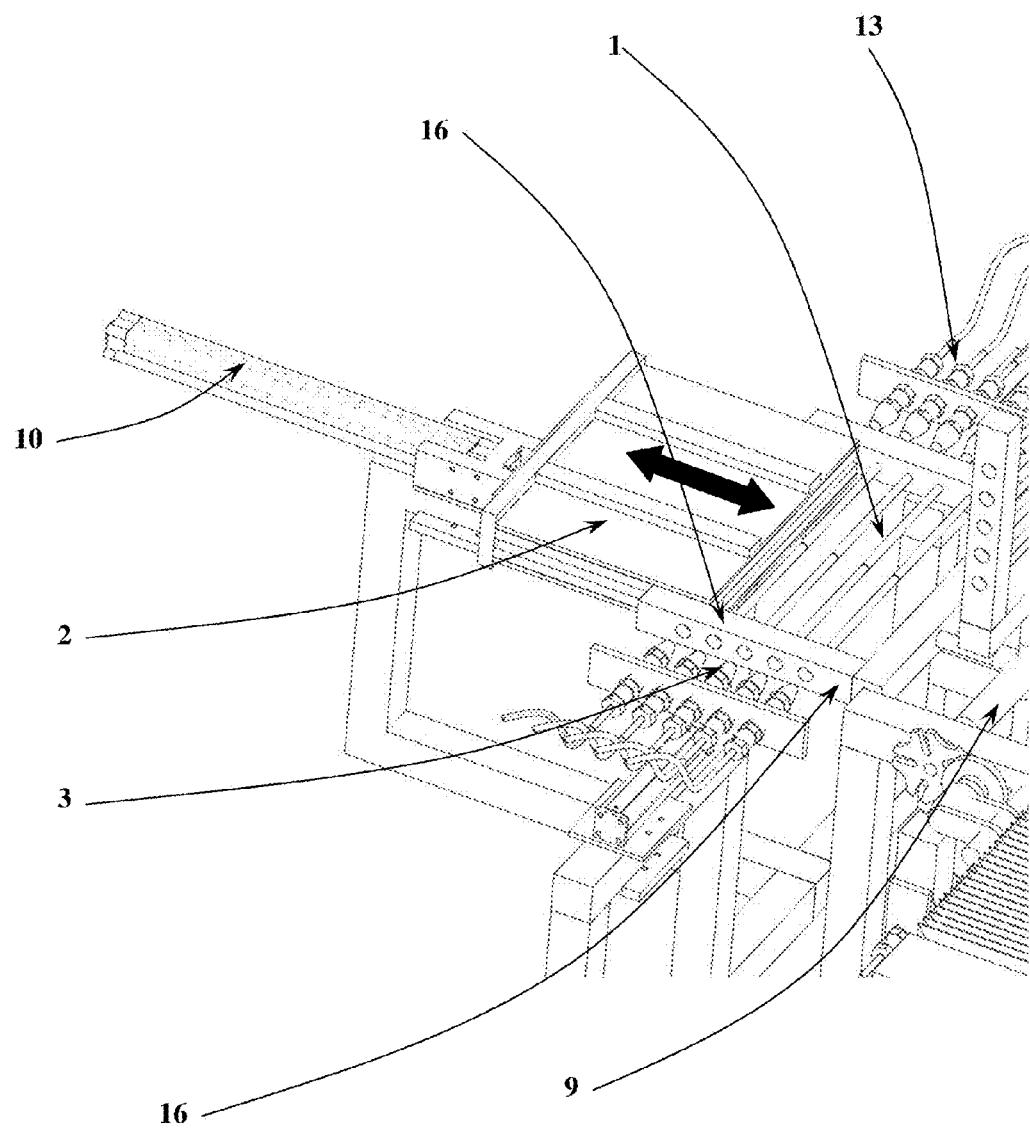

FIG. 4.—Illustrates a perspective view of the detail of the feeding zone of the reagents and the position in which the synthesis of the CNT is made. The arrow indicates the direction of the displacement of the furnace in order to cover the tubes where the CNT are synthesized and to get them to the synthesis temperature.

Figure 5:
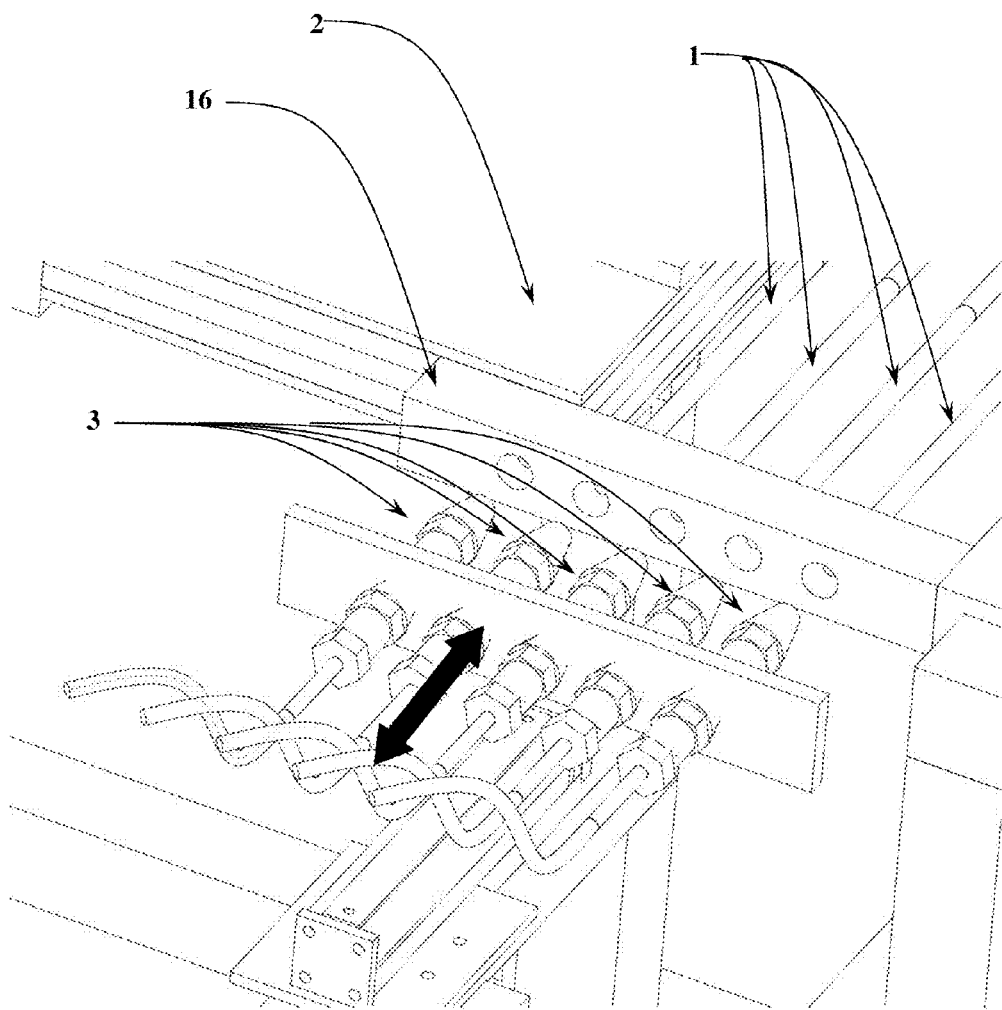

FIG. 5.—Illustrates a perspective view of the feeding zone of the CNT precursors. The retrieved position of the set of feeding nozzles is shown and the arrow indicates the direction of the same for the intake of the reagents.

Figure 6:
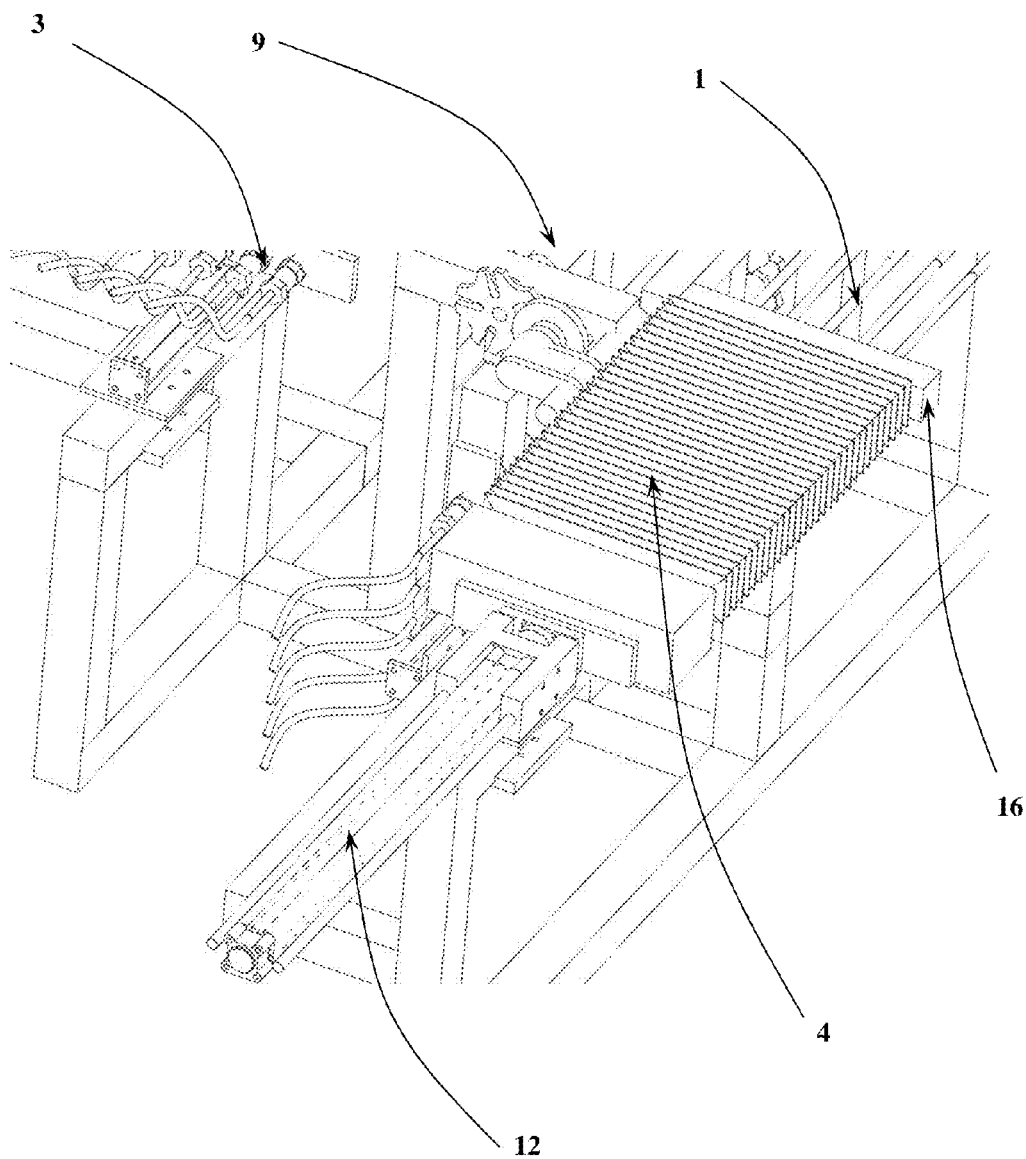

FIG. 6.—Illustrates a perspective view of the displacement unit and turn of the brushes used in the detaching of the CNT formed in the walls of the tubes.

Figure 7:
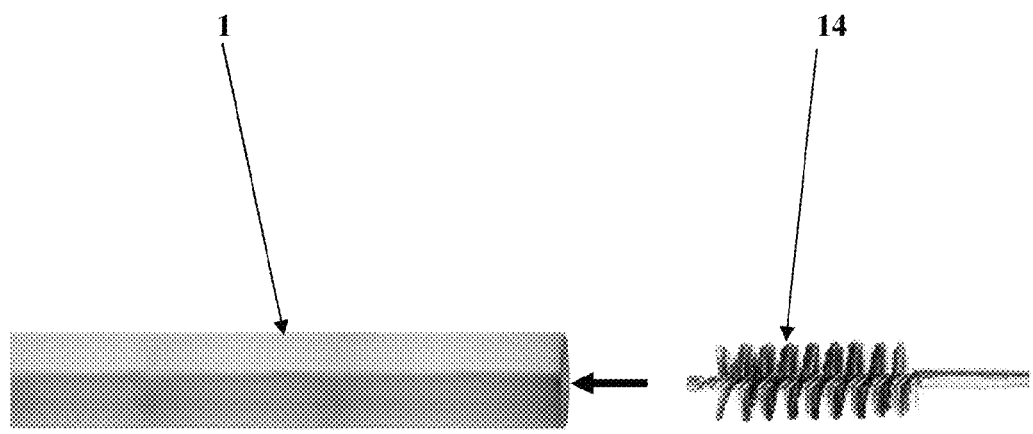

FIG. 7.—Illustrates the details of the brush used to brush off the CNT and the tube 1 in which the CNT is formed.

Figure 8:
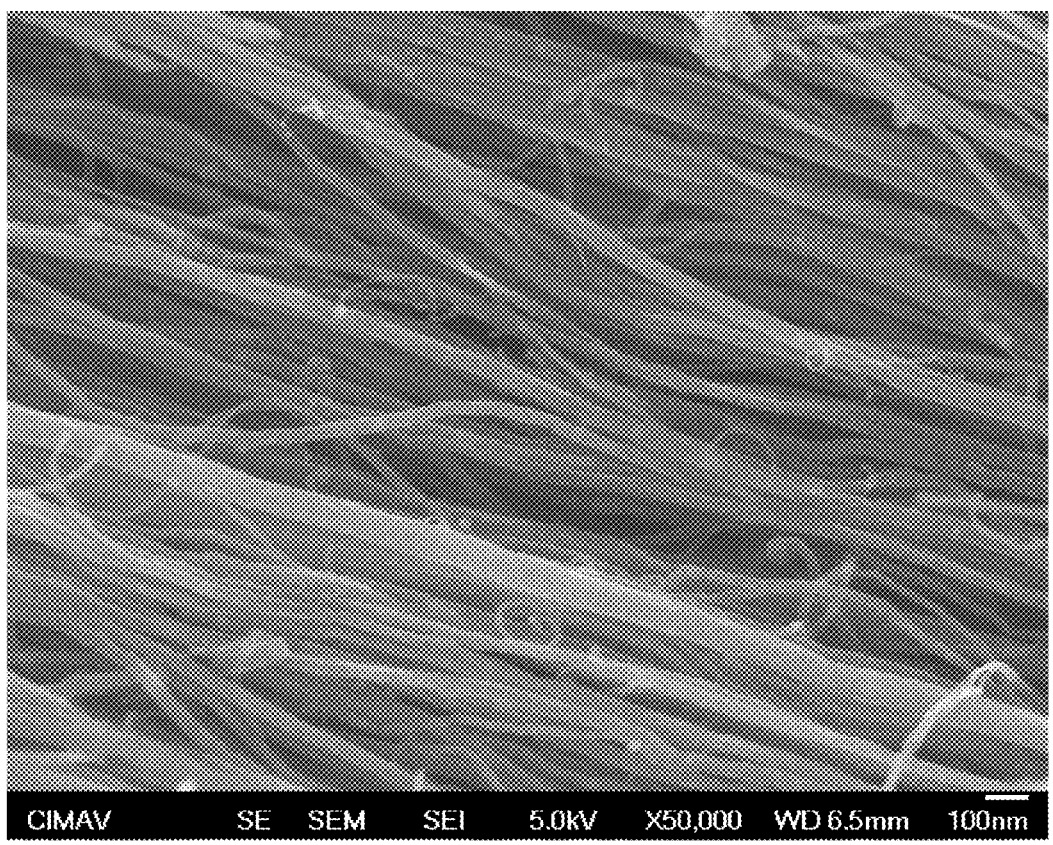

FIG. 8.—Illustrates the Carbon nanotubes obtained in the example.

DETAILED DESCRIPTION OF THE INVENTION

The present invention relates to a method and an apparatus for the continuous and massive production of carbon nanotubes. This apparatus for the CNT synthesis comprises:

Two sets or more of tubes 1 to synthesize CNT inside them. The tubes 1 are mounted in a frame 16, which can be rotated by the axis 9 with capacity to turn the position of the frame in the synthesis stations of CNT and in the collection of the produced CNT. The frame 16 rotates around the axis 9 by means of a piston, a stepper motor or a cam lever system not shown in the figures. The tubes 1 are located in the frame 16;

A set of feeding nozzles 3 for the same number of tubes 1 that each set has, to feed to the interior of the tubes 1 the chemical precursory compounds of the CNT and the required gases. This set of nozzles is fixed in the synthesis station of CNT and it is connected with the tubes 1 during the heating of the tubes, during the synthesis of CNT, and the cooling of the tubes, and is retrieved for the turning of the bank of tubes to the following position;

A set of discharge nozzles 13 for discharging the gases produced during the synthesis of the CNT. This set of discharging nozzles is fixed in the synthesis station of CNT and it is connected with the tubes 1 during the heating of such, the synthesis of CNT, and the cooling of the tubes and are retrieved for the turning of the bank of tubes to the following position;

A furnace 2 for maintaining one of the sets of tubes 1, to the appropriate temperature, between 600 and 1200° C., so that the formation of the CNT inside of them is produced;

A system for the detaching and collection 4 of the CNT formed in the previous stage. The system comprises rotary brushes 14, one for each tube, which in addition to turn, simultaneously advance and retrieve throughout the tube. This system is in the side opposed to the extraction nozzles 5.

A suction system that is connected through extraction nozzles 5 of CNT with the tubes 1 in the cleaning station. The suction system comprises extraction nozzles 5, a cyclone 6, a recipient 7 for the collection of the CNT and a vacuum device 8.

A control system, not shown in the figures, is preferably a programmable logic control or PLC by its abbreviation in English, to program the sequence of activities of the equipment in such a way that all of the operation is automatic.

Method of Production of the CNT

FIG. 1 shows the concept of the present invention integrated to a demonstrative equipment. For the CNT production, a device of any type is used to admix the liquids, in such a way that the set of feeding nozzles 3 is fed with a mixture on a hydrocarbon and a catalyst in the suitable proportion to produce the formation of CNT.

Each nozzle of the set has a heating system, not shown in the figure that is controlled between 70 and 300° C. to allow the passage of the liquid towards the set of tubes 1 where the CNT will form.

The furnace 2 is retrievable, and the positioning is made by means of a piston 10, in such a way that at the beginning of the process, the furnace is retrieved and has the temperature of synthesis of the CNT, for example, between 600 and 1200° C., preferably to 800° C.

As in the first step, the furnace 2 moves towards the position in which the tubes are inside the furnace and these are warmed up to reach the synthesis temperature. Simultaneously, the set of feeding nozzles 3 is positioned to feed the reagents towards the set of tubes 1 and the set of discharge nozzles 13 is positioned to discharge the exit gases after passing through the CNT synthesis tubes. After this, an inert gas flow is passed through each tube. The inert gas may be helium, neon, argon, carbon dioxide, or nitrogen (being the most preferred, due to lowest cost). In addition, mixtures of these gases can be used or even added reducing gases such as CO and hydrogen to favor the conditions of the synthesis.

As there is no restriction in the diameter and length of tubes, the flow is adjusted preferably in base to the linear speed of the gas that will be between 0.07 and 1 m/s, preferably 0.25 m/s. The inert gas flow is maintained through the heating stage and once the synthesis temperature is reached, then it begins the feeding of the hydrocarbon mixture and catalyst to produce the formation of the nanotubes. The reaction time is chosen based on the length required by the carbon nanotubes. The growth speed is based on the synthesis condition of the synthesis and hydrocarbon and catalyst used, as well as on the proportion between these.

Simultaneous to the positioning of the furnace 2 in order to produce the heating of one of the sets of tubes 1, that are in the synthesis position, in the cleaning position begins the process of removal of the CNT formed in the internal surface of the tubes 1 of that set. Thus, the set of extraction nozzles 5 is positioned against the bank of tubes to be cleaned and immediately the device for turning the brushes 4, begins to rotate each brush 14 and the piston 12 initiates the advance, so turning in combination with the advance displacement and retrieval of the brushes, detaching the CNT. The starting of the turning device activates a vacuum device 8 which facilitates the transport of the detached CNT from the set of tubes 1 by the discharging nozzles 5 towards the cyclone 6 that allows the separation of the CNT from the airflow and its accumulation in the collecting recipient 7. The number of passing of the brushes 14 in the interior of the tubes 1, depends on the facility for removing the CNT, which is based on the synthesis condition, since it varies according to the length of the CNT and the type of precursor and catalyst used. It is recommended to perform at least 20 cycles of advance and retrieval of the brushes that are turning, to leave the surface prepared for a new production of CNT, without this being limitative, since we have all the time in which the CNT in the set of tubes are in the synthesized position inside the furnace to carry out the cleaning of the tubes. Once the number of cycles of cleaning has concluded, the device for turning the brushes 4 is retrieved and the set of extraction nozzles 5 and the vacuum 8 is deactivated.

Meanwhile, the tubes that are in the synthesis position and once the time of CNT synthesis has been finalized, the hydrocarbon and catalyst feeding is suspended and the furnace 2 is retrieved by means of the piston 10 in such a way that the outside of the set of tubes 1 is exposed to the atmosphere. The set of nozzles 3 and the set of discharge nozzles 13 are not retrieved from the feeding and gas discharge position, since the feeding of the inert gas to the interior of the tubes 1 is kept during the specified cooling time that can be between 2 and 10 minutes, preferably 5 minutes. This is because if there is no inert gas flow in the cooling step, the air would cause the combustion of the CNT. When the cooling step is finished, the feeding nozzles 3 and the set of discharge nozzles 13 are retrieved and the mechanism for the positioning of the sets of tubes 9 rotates to the next position. As was previously mentioned, the furnace 2 stays to the reaction temperature even when it is retrieved.

The previously described method comprises the following steps:

Feeding the set of feeding nozzles 3 with a mixture of a hydrocarbon and a catalyst in the suitable proportion for the formation of the CNT.

Each nozzle of the set has a heating system that is controlled between 70 and 300° C. to pass the liquid towards the set of tubes 1 where the CNT will form.

The furnace 2 is retrievable, and the positioning is made by means of a piston 10, in such a way that at the beginning of the process, the furnace is retrieved and has the synthesis temperature of the CNT, namely, between 600 and 1200° C., preferably to 800° C.

The furnace 2 moves towards the position in which the tubes are inside the furnace and these are warmed up to reach the reaction temperature mentioned in c).

Simultaneously, the set of nozzles 3 is positioned towards the set of tubes 1 to feed the reagents and the set of discharge nozzles 13 is positioned to discharge the exit gases after passing through the synthesis tubes of CNT.

A flow of inert gas is passed through each tube. The inert gas can be helium, neon, argon, carbon dioxide, or nitrogen (being the most preferred). In addition, mixtures of these gases may be used or added reducing gases such as CO and hydrogen to favor the reaction conditions. The flow is adjusted preferably on the basis of the linear speed of the gas that will be between 0.07 and 1 m/s, preferably 0.25 m/s.

Once the synthesis temperature is reached, the feeding of the hydrocarbon and catalyst mixture begins to allow the formation of the nanotubes on the walls of tubes. The reaction time is chosen based on the length required for the carbon nanotubes.

Simultaneously to the positioning of the furnace 2 to allow the heating of the set of tubes 1 in the synthesis position, the cleaning position begins the process of removing the CNT formed in the surface of the tubes of that set.

The set of extraction nozzles 5 is positioned against the bank of tubes to be cleaned and immediately the turning device 4, begins to rotate each brush 14 and the piston 12 initiates the advance so the turning in combination with the displacement detaches the CNT from the internal surface of the tubes 1.

the starting of the turning device, activates the suction to the vacuum device 8 facilitating the transport of the CNT detached from the set of tubes 1 by the extraction nozzles 5 towards the cyclone 6, allowing the separation of the CNT from the airflow and its accumulation in the collecting recipient 7.

The number of passing of the brushes 14 in the interior of the tubes 1 will depend on the facility of removal of the CNT, which is based on the condition of synthesis. It is recommended to have at least 20 cycles of advance and retrieval to leave the surface prepared for a new production of CNT, without this being limited, since we have all the time in which the CNT in the set of tubes are in the synthesized position inside the furnace to carry out the cleaning of the tubes.

Once the time of the CNT synthesis has been finalized, the hydrocarbon and catalyst feeding is suspended and the furnace 2 is retrieved by means of the piston 10 in such a way that the outside of the set of tubes 1 is exposed to the atmosphere. The set of nozzles 3 and the set of discharge nozzles 13 are not retrieved from the feeding and the discharging gases position, since the feeding of the inert gas is maintained by the specific cooling time that can be between 2 and 10 minutes, preferably 5 minutes.

At the end of the cooling stage, the feeding nozzles 3 and the set of discharge nozzles 13 are retrieved, and the mechanism for positioning the sets of tubes 9 advances a position.

Example

Toluene was used as hydrocarbon precursor and ferrocene as a catalyst. The ferrocene concentration was 0.75 g/25 mL of toluene. The temperature in the furnace 2 was set at 900° C. and the inert gas flow was set at 1 mL/min of Argon. In the meantime, the mixture feeding of hydrocarbon and catalyst for each one of the tubes that form the set 1 was made to a flow of 1 mL/min, this one being in liquid form. The time of synthesis was 20 minutes. After the synthesis, the cooling time was 5 minutes. In the formed CNT collection stage, 20 passing with the brushes were made. In these conditions the production by each tube was of 1+/−0.2 grams of CNT, being the average diameter of 80 nm and the length 150 µm. FIG. 8 shows the produced carbon nanotubes in these conditions.

The invention claimed is:

1. An apparatus for the continuous production of carbon nanotubes having a synthesis station comprising:
   a) at least two sets of tubes to synthesize the carbon nanotubes inside them, each tube having a first end and a second end and located in a support;
   b) at least one set of feeding nozzles to feed to the interior of each tube chemical precursory compounds and gases for the formation of the carbon nanotubes, wherein each nozzle contacts the first end of the corresponding tube, wherein the number of feeding nozzles correspond to the number of tubes;
   c) a set of discharging nozzles for discharging the gases produced during the synthesis of the carbon nanotubes;
   d) a furnace for maintaining each one of the tubes at a predetermined temperature to allow the synthesis of the carbon nanotubes inside the tube;
   e) a cleaning device for detaching and collecting the nanotubes from inside of each tube, wherein the cleaning device contacts the first end of each tube, wherein the device comprises a rotary brush for each tube, wherein the device is able to turn and simultaneously advance and retrieve the brushes throughout the tube;
   f) a suction device connected through extraction pipes to the cleaning device, wherein the suction device comprises extraction nozzles and pipes, a cyclone, a recipient for the collection of the carbon nanotubes, and a vacuum source; and
   g) a control system to automatically program the sequence of activities of the apparatus;
   wherein the tubes are mounted about an axis, wherein the tubes rotate about the axis between the synthesis station and the cleaning device.

2. The apparatus of claim 1, wherein the furnace temperature is between 600 and 1200° C.

3. The apparatus of claim 1, wherein the control system is a programmable logic control (PLC).

4. The apparatus of claim 1, wherein the tubes rotate about the axis by means of a piston, a stepper motor, or a cam lever system.

5. The apparatus of claim 1, wherein each feeding nozzle is fixed in the synthesis station and is connected with the corresponding tubes during the heating of the tubes, the synthesis of the carbon nanotubes, and the cooling of the tubes.

6. The apparatus of claim 1, wherein each discharging nozzle is fixed in the synthesis station and is connected with the corresponding tubes during the heating of the tubes, the synthesis of the carbon nanotubes, and the cooling of the tubes.

* * * * *